(12) United States Patent
Delaunay et al.

(10) Patent No.: US 11,618,203 B2
(45) Date of Patent: Apr. 4, 2023

(54) METHOD FOR MANUFACTURING PLASTIC CONTAINERS BY BLOW MOLDING

(71) Applicant: SIDEL PARTICIPATIONS, Octeville-sur-mer (FR)

(72) Inventors: Arnaud Delaunay, Octeville-sur-mer (FR); Hervé Pasquier, Octeville-sur-mer (FR)

( * ) Notice: Subject to any disclaimer, the term of this patent is extended or adjusted under 35 U.S.C. 154(b) by 948 days.

(21) Appl. No.: 16/316,199

(22) PCT Filed: Jul. 7, 2017

(86) PCT No.: PCT/FR2017/051857
§ 371 (c)(1),
(2) Date: Jan. 8, 2019

(87) PCT Pub. No.: WO2018/011490
PCT Pub. Date: Jan. 18, 2018

(65) Prior Publication Data
US 2021/0276240 A1    Sep. 9, 2021

(30) Foreign Application Priority Data

Jul. 11, 2016  (FR) ...................................... 1656641

(51) Int. Cl.
| | |
|---|---|
| *B29C 49/78* | (2006.01) |
| *B29C 49/62* | (2006.01) |
| *B29C 49/46* | (2006.01) |
| *B29C 49/64* | (2006.01) |
| *B67C 3/22* | (2006.01) |
| *B67C 7/00* | (2006.01) |

(Continued)

(52) U.S. Cl.
CPC .......... *B29C 49/46* (2013.01); *B29C 49/6418* (2013.01); *B29C 49/78* (2013.01); *B67C 3/22* (2013.01); *B67C 7/00* (2013.01); *B29K 2067/003* (2013.01); *B29L 2031/7158* (2013.01); *B67C 2003/227* (2013.01)

(58) Field of Classification Search
CPC ...... B29C 49/62; B29C 49/4284; B29C 49/78
See application file for complete search history.

(56) References Cited

U.S. PATENT DOCUMENTS

| | | |
|---|---|---|
| 3,865,913 A | 2/1975 | Lachner et al. |
| 8,936,458 B2 | 1/2015 | Senn et al. |

(Continued)

FOREIGN PATENT DOCUMENTS

| | | |
|---|---|---|
| DE | 10 2008 052609 | 4/2010 |
| EP | 1 306 195 | 5/2003 |
| EP | 2 537 664 | 12/2012 |

OTHER PUBLICATIONS

International Search Report, PCT/FR2017/051857, dated Oct. 11, 2017.

*Primary Examiner* — Robert B Davis

(57) ABSTRACT

Disclosed is a method for forming blanks made from plastic material into containers, the method including steps of blowing into the blanks in such a way as to form them into containers, then internally degassing the formed containers. In the method, the steps are carried out according to a first cycle at a first rate. Then, during a second subsequent cycle of steps carried out at a second rate slower than the first rate, a time delay is added with respect to the first cycle, during or after degassing, such that the second cycle lasts longer than the first.

20 Claims, 4 Drawing Sheets

(51) Int. Cl.
  *B29K 67/00* (2006.01)
  *B29L 31/00* (2006.01)

(56) References Cited

U.S. PATENT DOCUMENTS

| | | | |
|---|---|---|---|
| 9,610,725 B2 | 4/2017 | Gendre et al. | |
| 2012/0326345 A1* | 12/2012 | Gendre | B29C 49/786 264/40.1 |
| 2015/0209997 A1* | 7/2015 | Lemble | B29C 49/783 264/529 |
| 2015/0321412 A1 | 11/2015 | Deau | |

* cited by examiner

METHOD FOR MANUFACTURING PLASTIC CONTAINERS BY BLOW MOLDING

The invention relates to the manufacture of containers made of plastic material from blanks, for example bottles made of polyethylene terephthalate (PET).

The invention thus relates to a method for transforming blanks made of plastic material, typically preforms, into containers.

The method according to the invention comprises a cycle of steps including at least one step where the pressurized blow-molding fluid, typically air, is injected into the blanks so as to transform them into containers, then a step where the formed containers are degassed internally.

To form these containers, it is standard to use a blow-molding machine (also known as a blower or blow-molding machine, or stretch-blow-molding machine) provided with a series of blow-molding or stretch-blow-molding stations comprising forming molds positioned on the periphery of a carousel.

In the prior art, such blow-molding machines typically operate with a constant nominal output rate. However, a constant output speed can lead to drawbacks, in particular if the blow-molding machine is, as is common, installed upstream from a production and packaging line, comprising, for example, downstream machines for filling, sealing, labeling, etc.

In this case, the various manufacturing and/or packaging machines are dynamically linked to one another, typically by means of transfer star wheels. Thus, the output rates of the various machines are dependent on one another. Now, it would often be beneficial to have certain machines or groups of machines be able to be slowed down or speeded up depending on needs, for example in case of breakdown of one of the following machines. However, this is at a minimum complicated and costly (need for the presence of buffer zones that temporarily store containers), in particular if the blow-molding machine is used as the leading machine that controls the rate of the entire manufacturing and packaging line.

U.S. Pat. No. 8,936,458 proposes that, on a blow-molding machine, a control device acts so that the steps for forming the containers are carried out independently of the location of the blanks along their movement path, so that the output rate of these containers is variable. In this case, the blanks are preforms.

With regard to EP 2537664, it proposes a modification of the rate of heating of blanks of plastic material.

However, these solutions do not appear sufficient to be assured of a quality suitable for production during a variation in the rate and in particular to prevent containers that are malformed or with dimensions that are different from one another from becoming jammed in the production line and causing line stoppages, even altering the quality or quantity of production for the client and/or the final consumer.

It is also proposed here that the above-mentioned method, which therefore makes it possible to form blanks of plastic material into containers, via a cycle of steps that includes at least the steps where the blanks are blown into so as to form them into containers and then the formed containers are degassed internally, is also such that:
said steps according to a first cycle are performed at a first rate, then,
during a subsequent second cycle of steps being performed at a second rate that is lower than the first rate, the steps are begun at the same time as for the first cycle, and a delay is added relative to the first cycle, during or after the degassing, so that the second cycle is temporarily lengthened relative to the first.

Thus, a buffer time interval suited to compensate for the variation in the cycle times between the two cycles can be obtained.

In this way, since, by the reduction in rate of an initial cycle of steps, the slowed-down cycle is temporarily longer than the initial cycle, the delay added to the slowed-down cycle makes it possible that the quality of the formed containers is not affected: it in fact makes it possible to keep the duration and the timing of the essential steps of the blow molding (pre-blow molding, blow molding) constant: in other words, the blow-molding curve is not affected.

Consequently, over a complete production line, it will be possible to obtain a continuous operation of subsequent steps of packaging of the formed containers.

Given that the delay will take place during or after the degassing, it can be appropriate that, during this delay, the interior of the formed containers be at atmospheric pressure.

Actually, since the degassing step in the above context comprises a degassing of the pressurized blow-molding fluid (typically air) through its venting, it will therefore be possible to take advantage of this venting to prolong the degassing phase, without that affecting another more critical forming operation, such as the blow molding, or an optional pre-blow molding and/or a stretching (before blow molding and therefore optional pre-blow molding).

Furthermore, it may be preferred that, during the reduced-rate second cycle, (at least) in the blow-molding step, the same duration as that of the blow-molding step of the first cycle is maintained.

And if each blow-molding step includes (begins with) a pre-blow molding, it will be possible to maintain in the pre-blow-molding step of the second cycle the same duration as that of the pre-blow-molding step of the first cycle.

During a variation in rate of the blow-molding machine, in production, the blow-molding cycle time varies as a function of the speed of rotation of the machine. This phenomenon creates a variation in the time of keeping the containers under pressure in the blow-molding molds, which causes variations in volumes and in impression-taking and therefore can alter the quality of the containers. In fact, usually, during a change in speed of rotation, the pre-blow-molding times (if included), the degassing times, and the downtimes (times when the pipe caps the mold to blow mold the container) remain fixed. Only the blow-molding time varies. In such a case, the blow-molding time compensates for the variation in cycle time.

Maintaining—over cycles at different rates—the same times for the blow molding, even the optional pre-blow molding, will therefore be useful for maintaining the quality of the containers.

Concerning the manufacturing cycles, it will furthermore be favorably provided that a so-called cycle of steps, typically performed on a blow-molding machine, comprises:
a step where previously-heated blanks will be placed in certain individual molds, then empty, and these molds will be closed,
then said blow-molding step where the preheated blanks will be blow molded, to obtain containers with, possibly included, a pre-blow-molding step where blowing into the preheated blanks at a pressure that is lower than the blow-molding pressure will take place,
then said degassing step where the containers obtained will be degassed internally, then a step where the molds of the degassed containers will be opened and said containers will be removed from them.

Preferably, on such a blow-molding machine where the entire method will be performed, there will further be maintained—for each of the steps of said second cycle other than that of degassing—the same times as those reserved for each of these same steps during the first cycle of steps at the first (higher) rate.

During a variation in the rate of the blow-molding machine, all of the cycle times before and after degassing will therefore remain fixed with, for the degassing step, either a duration that will vary, or a buffer time that will be added at the conclusion of degassing. Thus, a buffer zone will be created after the blow-molding phase, this buffer making it possible to compensate for the variation in the cycle time, without altering the quality of the formed containers. In fact, since the cycle times reserved for each step are identical, at high rate and at reduced rate, independently of the total cycle time, the blow-molding curve will remain identical and therefore the quality of the containers as well. A control system based on the analysis of the blow-molding curve can make it possible to ensure that the blow-molding curve remains effectively identical despite this variation in the rate.

From a practical point of view, it is recommended:
to perform the steps of a complete cycle of production steps on a blow-molding machine having a rotating carousel and having multiple individual molds distributed on its periphery,
and this preferably on a virtual rotation of the carousel.

In addition to the forming of plastic containers, the invention here also relates to a method for producing, in accordance with said two cycles of steps, such containers that are filled, sealed and/or labeled.

As a result of the aforementioned forming method, it will actually be possible to apply to said formed containers:
a filling step,
then a sealing step,
and/or a step for labeling these containers, with:
during both the first and second cycle of steps, a continuous performing of the steps of sealing, filling and/or labeling.

And it has also been possible that the rate of the first cycle of steps corresponds to the maximum rate permissible by the blow-molding machine.

Generally, these solutions of the invention will make it possible to prevent the malformed containers, or those with dimensions that are different from those required, from becoming jammed in the production line and causing line stoppages, the rate of production of the blow-molding machine varying as a function of the rate of the entire production line, in order to adjust to the constraints of the latter.

If necessary, the invention will be still better understood and other characteristics, details and advantages of it will emerge further from reading the following description, made by way of nonlimiting example and with reference to the accompanying drawings, in which.

Figure 4:
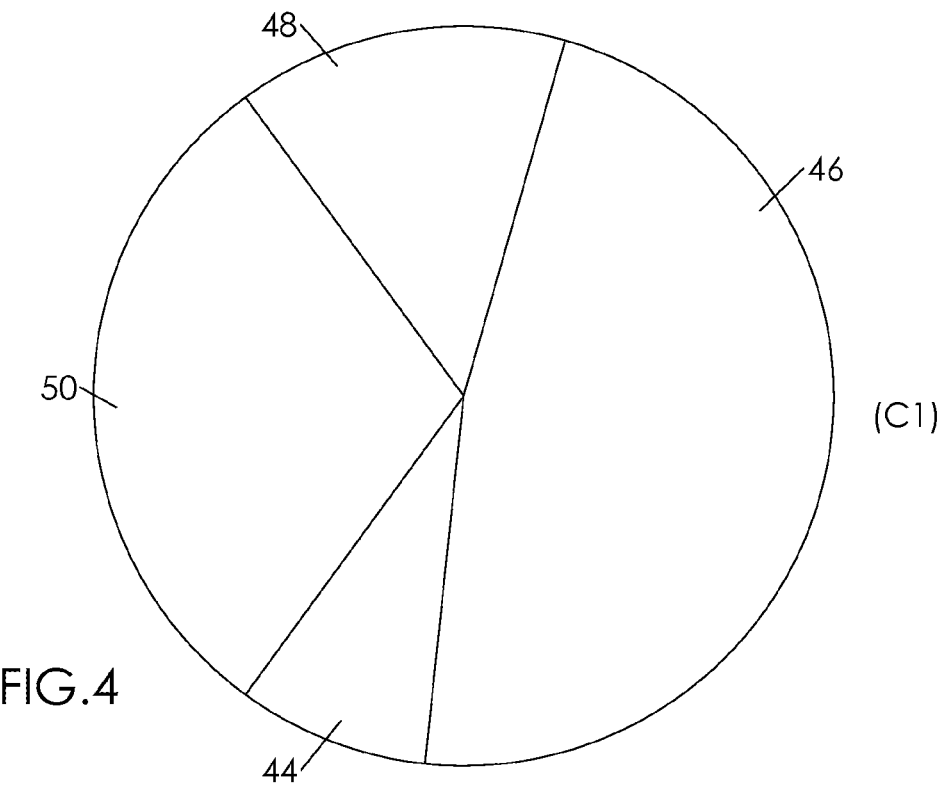
Figure 5:
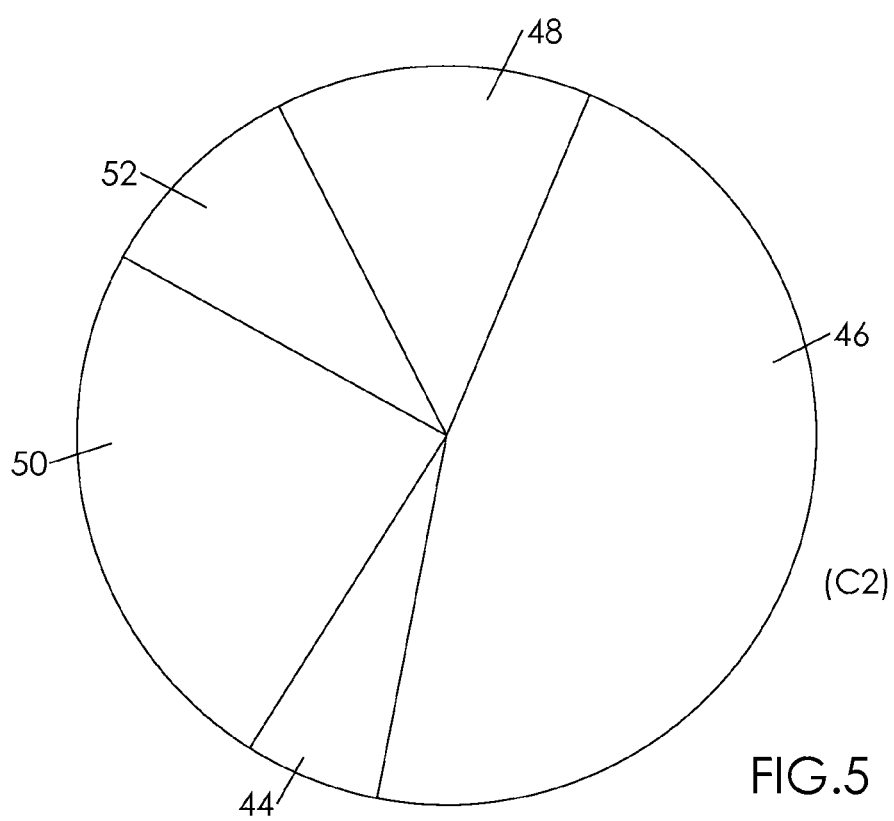

and FIGS. 4 and 5 are diagrammatic graphs respectively of a first cycle of steps in a blow-molding machine or unit and of a second cycle of steps in the same machine, but at a reduced rate. If, between the two graphs, the durations, for example, of the blow-molding phase seem different when they are identical here, it is because of the total time of the complete cycle (a graph rotation) that is longer in FIG. 5, which causes the proportions of the successive phases to vary between themselves.

Figure 1:
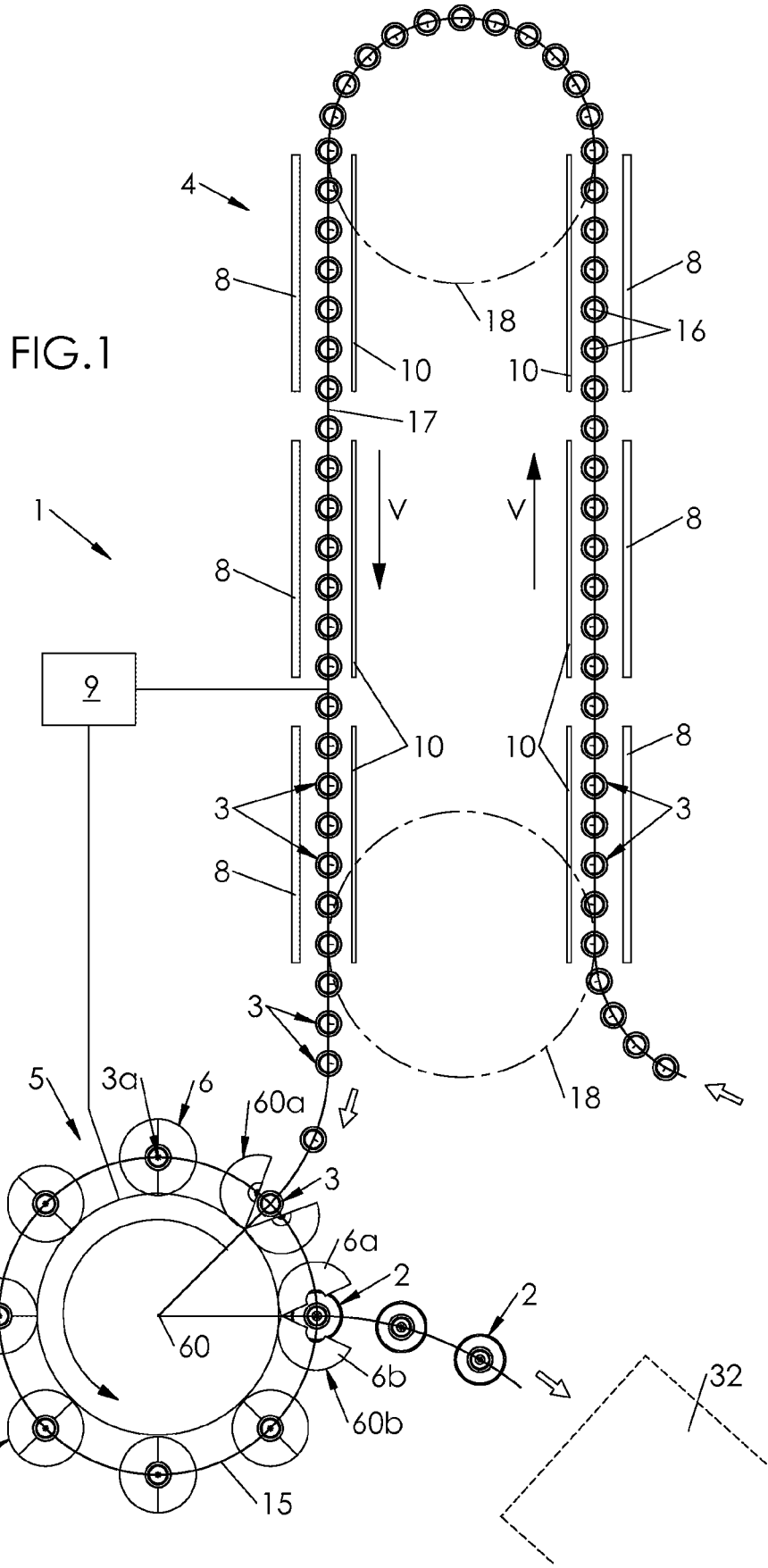
FIG. 1 is a diagrammatic plan view showing a blow-molding machine for the manufacture of containers comprising a unit for heating blanks and a unit for blow-molding containers from the heated blanks.

FIG. 1 diagrams a machine 1 for manufacturing containers 2, such as bottles or jars, by blow molding or stretch blow molding of blanks 3 (generally preforms, although it can involve intermediate containers) of thermoplastic material, such as polyethylene terephthalate.

Figure 3:
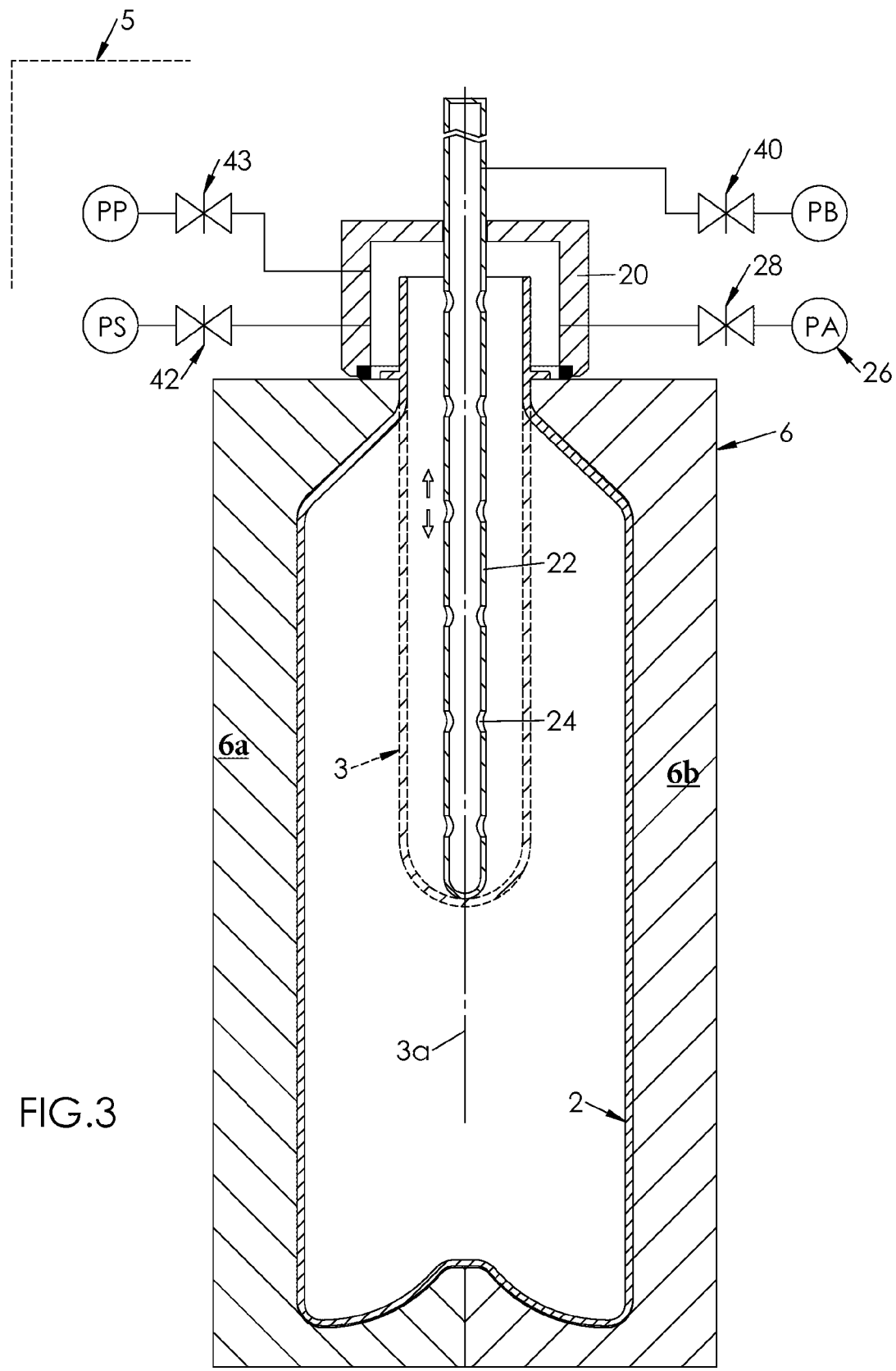
FIG. 3 is a diagrammatic cutaway view partially showing the blow-molding machine of FIG. 1, at the location of a mold.

The manufacture of a container 2 has two principal phases:
the prior manufacture, in an injection mold (not shown), of the blank 3, tube-shaped, from plastic material;
then, in a mold 6 of a blow-molding or stretch-blow-molding unit 5 of the machine 1, the injection of a compressed gas (such as air) inside the previously heated blank 3; the material then is stretched, becomes flattened against the impression and conforms to the shape of the mold 6 (see FIG. 3, with the blank 3 in dotted lines that changes to the container 2 in solid lines).

Then, the mold 6 is opened, and the container 2 is brought out of the blow-molding unit 5.

During the first phase, which comprises heating the blank 3 by moving a series of blanks into a heating unit 4 (currently called "oven"), the blanks travel in front of a row of infrared radiation sources 8, 10—typically halogen lamps or laser emitters—at a predetermined speed of travel and along a predetermined heating profile. The speed of travel in the oven is the linear speed at which the preforms circulate, preforms that are hanging from rotating supports or "spinners" mounted on a chain 17 driven in movement by a wheel 18. Each spinner is driven in rotation around a spindle 16 that is integral with the chain 17, itself driven in movement by one or more wheels 18 whose powering is controlled by a central control unit 9.

The modification of the speed of travel of the blanks 3 brings about a modification of their exposure time in front of the radiation sources. Consequently, this modification of the speed of travel necessitates a modification of the parameters for heating the blanks 3 so as to maintain a heating profile that is identical from one to the other and this despite the modification of the speed of travel.

Typically, the specialist operators that are in charge of the ovens apply, for each production range, a standardized heating profile as a function of the type of blank to be heated, and with a constant rate of heating (i.e., a speed of travel of the preforms) that is determined by the rate of production imposed by the critical machine, typically the blow-molding unit 5.

In an alternative embodiment, the heating unit 4 is made up of laser emitters that emit in the range of the infrared. This type of heating unit 4 has the advantage of not having thermal inertia relative to the infrared lamps and therefore makes it possible to adjust in real time the heating profile of the blank 3 to the modification of the speed.

Exiting from the heating unit 4 on their conveyor, the heated blanks 3 undergo a blow molding or a stretch blow molding, with a possible pre-blow molding, within the blow-molding unit 5.

This blow-molding unit 5 is placed directly at the output of the heating unit 4. It is provided with a series of molds 6, 60a, 60b . . . , which are each part of a blow-molding station of the unit. As explained subsequently, a station, in addition to a mold, comprises a stretching rod, a blow-molding nozzle, and means for fluid connection from the station to pressurized gas sources.

Under the control of the central control unit 9 and inside each mold 6, a blow molding can therefore take place during which a pressurized fluid (generally a gas, ordinarily air) is injected into the heated blank 3 that has been loaded there, to impart to it the final shape of the container 2.

In the example, the blow-molding unit 5 is a stretch-blow-molding unit, particularly suited to the manufacture of bottles.

On this blow-molding unit 5, here of the rotating carousel type, the blow-molding molds 6, 60a, 60b . . . are mounted on the periphery of a carousel 15 that is driven continuously in rotation around an axis 60. A sensor is typically provided to follow the instantaneous angular position of the carousel, in the form of, for example, an encoder (in practice, often a sensor-equipped bearing).

A blow-molding mold can comprise two parts 6a, 6b that can move in relation to one another, in a linear fashion or book-like (solution diagrammed), between two positions, the one closed, around a blank and then a container (mold 60c), and the other open, to allow a blank to enter or a container to exit (molds 60a, 60b respectively). Preferably, a mold has in addition a third part constituting a mold bottom 7, mobile in axial translation in relation to the first two parts 6a, 6b. The axial mobility of the mold bottom 7 facilitates the removal of the container from the mold. In closed position, each cavity defined by the two parts 6a, 6b and the mold bottom 7 forms the impression of the container 2 to be blow molded, as shown in FIG. 3.

Under the coordinated control of the central control unit 9, the blow-molding unit 5 is such that each blow-molding station functions in a cyclical manner according to a blow-molding cycle comprising the following steps:

a step for placement of the blank 3 arriving in the mold 6, 60a, 60b that, in FIG. 1, is presented open in front of it;

a step for closing the blow-molding mold (position just to the left of the mold 60a in FIG. 1);

a step for blow molding the blank by means of a nozzle 20 (FIG. 3) for blowing (with optional pre-blowing) fluid into the blank, the nozzle then capping the closed mold 6, this blow-molding step including, in an approximately simultaneous manner, a step for stretching the blank by axial insertion (axis 3a of the mold, parallel to the axis 60) of a stretching rod 22 inside the blank by bearing against the bottom of the blank, so as to facilitate the axial lengthening of this blank;

a step for the ambient air degassing from the interior of the container to the atmosphere. As a variant, this step can be completed by a flushing of the interior of the container 2 by a fluid at intermediate pressure between the blow-molding pressure and the ambient pressure, for example by injection of air through a number of orifices 24 provided in the stretching rod 22, so as to cool the container to facilitate its release from the impression of the cavity of the blow-molding mold 6, this step terminating in any event with an ambient venting 26 from the interior of the container, via a valve 28 controlled by the central control unit 9, as are the other valves 40, 42, 43 cited below;

a step for axial raising of the stretching rod 22 outside of the formed container, as well as the raising of the nozzle 20, to make possible its removal;

a step for gripping the container 2 by outside gripping means;

a step for opening the blow-molding mold (mold 60b in FIG. 1) a priori just before the carousel 15 has made a complete rotation around its axis 60, the opening consisting in separating the two parts 6a, 6b and the mold bottom 7 relatively in relation to one another;

a step for removal of the container 2 upon completion of the opening of the mold.

Thus, on a rotating carousel, two adjacent molds (60a, 60b, FIG. 1) (which follow one another) can be open, one to load a blank 3, the other to unload a container 2, all of the other molds, in between them, being used to conduct the blow-molding (with optional pre-blow-molding and/or stretching) steps, then degassing (with possible flushing within the framework of a heat resistance/high resistance HR process).

In a machine for blow molding particularly containers, each blank 3 can comprise a body, generally rotationally cylindrical, a neck at an axial end, which constitutes the rim of the container to be formed, and a bottom, generally hemispherical, which closes the body at the axial end opposite to the neck. Previously heated in the heating unit 4 to a temperature higher than the glass transition temperature of the material (about 80° C. in the case of PET), the material of this blank, softened by the heating, forms a bubble that grows and expands simultaneously in an axial direction, parallel to the main axis 3a of the mold, and in a radial direction, perpendicular to the axis of the mold. The axial stretching of the blank by a rod that can move axially in the mold makes it possible to prevent an offsetting of the container and to ensure a good uniform distribution of the material.

At the output of the blow-molding unit 5, the manufacturing itself of the containers 2 is completed.

However, the heating and blow-molding units (machines) are generally part of a production line 30 that also comprises, downstream from the blow-molding unit 5, a filling unit 32 (or filler), associated with a sealing unit 34, and/or optionally a labeling unit 36 and/or a bundling unit 38 (for example, a bundler).

If they exist (see FIG. 2):

the filling unit 32 (or filler) receives containers 2 and fills them. It can include a unit for rinsing the containers before filling, which is equipped with arms injecting a rinsing solution, for example chlorinated, into the containers to wash them and also to disinfect them. The rinse water is collected in a recovery tank, the sealing unit 34 places and closes seals on filled containers 2, the labeling unit 36 places and sticks labels on the bodies of containers 2 that are possibly previously filled and sealed, and the bundling unit 38 groups together a series of containers 2 possibly previously filled and sealed and/or labeled and secures them together, with a binding that typically surrounds them and holds them, such as a heat-shrinkable film.

Figure 2:
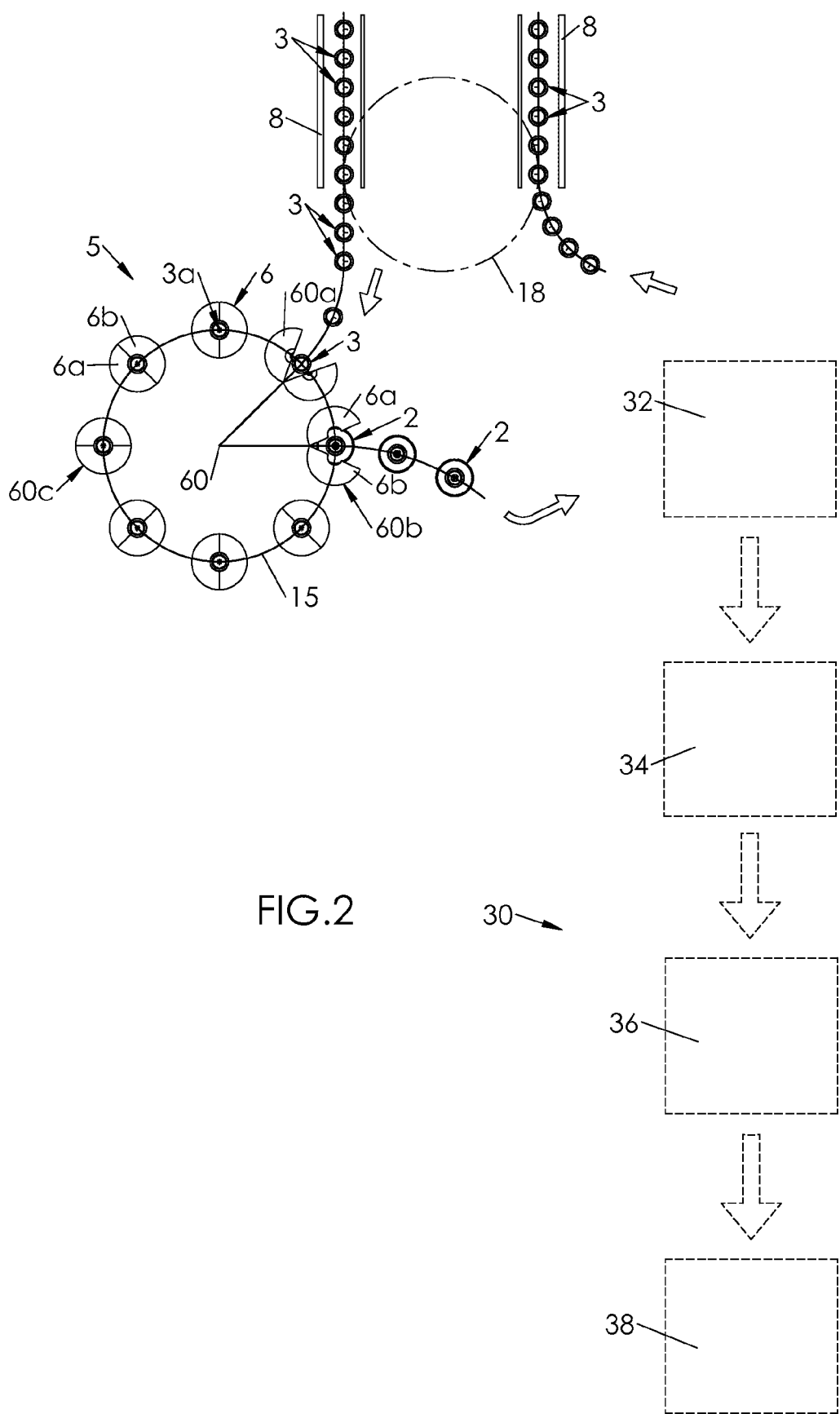
FIG. 2 is a diagrammatic view completing FIG. 1, with units for sealing, filling and/or labeling positioned downstream from the blow-molding unit of FIG. 1.

Alternatively, the filling, sealing, labeling, bundling units can be positioned in an order that is different than in the production line 30 described by FIG. 2.

The production line 30 can typically operate entirely under the coordinated control of the central control unit 9. Its rate (i.e., the speed of travel of the preforms and then of the formed containers) is normally determined by the rate imposed by the critical machine, often therefore the blow-molding unit 5.

Now, it is typically appropriate that all or part of the units 32, 34, 36, 38 operate continuously.

So as to maintain this continuous operation even if a problem with production of the containers 2 occurs, it is therefore on the rate of a portion of the cycle of steps of the blow-molding unit 5 that intervention will take place by slowing the rate of advance, in this case therefore the speed of rotation, of the blow-molding unit 5, with the consequence of temporarily lengthening this cycle having a slowed-down rate.

In fact, by way of the central control unit 9, and when the production line 30 is operating according to a first cycle of steps performed in the blow-molding unit 5, a first rate C1 of this machine is used:
 on the one hand, to reduce said rate to a rate C2 that is less than the first rate C1,
 and, on the other hand, to add a delay Tt relative to the first cycle, during or after the degassing step, so that the second cycle of steps is therefore temporarily lengthened relative to the first cycle, it being considered that a given cycle comprises at least one blow-molding step and one step for interior degassing of the formed containers 2, as already indicated.

FIGS. 4 and 5 diagram this with—for the two cycles C1 and C2 that are compared, each time, in the example—a pre-blow-molding step 44 followed by a blow-molding step 46 (that here have been separated for the sake of a clear illustration), followed by the degassing step 48.

It will be considered that the durations of the steps of the same molding/blow-molding cycle are each defined, for their beginning and their end, respectively by the moments of opening and closing of the valves of the pipes reserved for the fluids used during the blow-molding and degassing steps, such as the valves 28 for vented degassing, the valve 40 for flushing, and the valve 42 for blow molding (with optional pre-blow molding).

If the degassing comprises a flushing of the interior of the containers 2, the delay Tt will be added after this flushing, so that its duration, optimized for all of the containers, is not altered.

In fact, the delay Tt will take place favorably when the interior of the formed containers 2 is at atmospheric pressure. It will be possible to choose to keep the valve 28 open longer, or to close it and allow said delay Tt to elapse.

In this regard, it has been established that this delay during the second cycle C2 (having a reduced rate) could last between 100 and 300 ms, this corresponding:
 to a lengthening of the degassing time relative to the degassing time during the first cycle C1,
 or to a time interval that is reserved upon completion of this degassing step, before opening of the molds.

Thus, the delay during the second cycle of steps will be able to correspond to a lengthening of the degassing time, for example of the above-mentioned duration, relative to the degassing time during the first cycle of steps, or to such a time interval reserved at the completion of this degassing step of the second cycle of steps, before opening of the molds.

In any event, during the reduced-rate second cycle C2, the duration of the blow-molding (with optional pre-blow-molding) step will be favorably the same as that of the blow-molding step of the cycle C1, which will stabilize in all situations the pressures and times for keeping the containers under pressure that are in the blow-molding molds 6, thus preventing variations in volumes and in impression-taking.

FIGS. 4 and 5 show in addition that on the blow-molding machine of the example, for each of the steps of said second cycle C2 other than the degassing step 48, the same times as those reserved for each of these same steps during the first cycle of steps C1 have been maintained, at the first (higher) rate.

The intermediate "downtimes" 50, therefore between the end of the degassing step 48 of one cycle and the beginning of the pre-blow-molding step 44 of the following cycle, have also been maintained.

It is therefore only natural that appearing in FIG. 5 is this buffer interval 52 during the cycle C2, which relates to the delay according to the invention between the end of the degassing step 48 and the beginning of the "downtimes" 50, during which the pressure in the molds concerned can thus be established at the ambient pressure.

The invention claimed is:

1. Method for forming blanks (3) of plastic material into containers (2), the method comprising a cycle of steps including at least steps (44, 46, 48) where the blanks are blown into so as to form them into containers, then the formed containers are degassed internally, wherein:
 said steps according to a first cycle are performed at a first rate (C1), then,
 during a subsequent second cycle of steps being performed at a second rate (C2) that is lower than the first rate, the steps are begun at the same time as for the first cycle, and a delay (Tt) is added relative to the first cycle, during or after the degassing step (48), so that the second cycle is temporarily lengthened relative to the first.

2. Method according to claim 1, where, during the delay, the interior of the formed containers (2) is at atmospheric pressure.

3. Method according to claim 1, where, during the second cycle, in the blow-molding step (46), the same duration as that of the blow-molding step (46) of the first cycle is maintained.

4. Method according to claim 1, wherein said cycle of steps comprises:
 placing previously-heated blanks (3) in certain individual molds, then empty, and these molds (6, 60a, 60b) are closed,
 blowing the preheated blanks to obtain containers (2),
 degassing the containers (2) obtained,
 opening the molds of the degassed containers and said containers are removed from them.

5. Method according to claim 1, wherein each blow-molding step (46), during which the blanks (3) are blow molded at a second pressure, includes a pre-blow-molding step (44), during which the blanks (3) are blow molded at a first pressure that is less than the second pressure, and the same duration is maintained at the pre-blow-molding step of the second cycle as that of the pre-blow-molding step of the first cycle.

6. Method according to claim 1, wherein:
 the degassing step (48) comprises a flushing of the interior of the containers (2) at an intermediate pressure between a blow-molding pressure used during said blowing into the blanks and the atmospheric pressure, and
 the delay (Tt) is added after said flushing.

7. Method according to claim 1, wherein, on a blow-molding unit (5) where the entire method is performed, and, during the second cycle of steps, and except for said step where the formed containers (2) are degassed internally, maintained for each of the other steps of the cycle (C2) are the same times as those reserved for each of these same steps during the first cycle (C1) of steps at the first rate.

8. Method for producing, according to a first and then a second cycle of steps, filled and sealed containers (2), the method comprising:
forming blanks of plastic material into containers, with the method according to claim 1,
filling the formed containers,
sealing the filled containers, and/or
labeling the formed containers, wherein, during both the first and the second cycle of steps, a continuous operation of these sealing, filling, and/or labeling steps.

9. Method according to claim 8, wherein the rate of the first cycle of steps (C1) corresponds to the maximum allowable rate.

10. Method according to claim 2, wherein, during the second cycle, in the blow-molding step (46), the same duration as that of the blow-molding step (46) of the first cycle is maintained.

11. Method according to claim 2, wherein said cycle of steps comprises:
placing previously-heated blanks (3) in certain individual molds, then empty, and these molds (6, 60a, 60b) are closed,
blowing the preheated blanks to obtain containers (2),
degassing the containers (2) obtained,
opening the molds of the degassed containers and said containers are removed from them.

12. Method according to claim 3, wherein said cycle of steps comprises:
placing previously-heated blanks (3) in certain individual molds, then empty, and these molds (6, 60a, 60b) are closed,
blowing the preheated blanks to obtain containers (2),
degassing the containers (2) obtained,
opening the molds of the degassed containers and said containers are removed from them.

13. Method according to claim 2, wherein each blow-molding step (46), during which the blanks (3) are blow molded at a second pressure, includes a pre-blow-molding step (44), during which the blanks (3) are blow molded at a first pressure that is less than the second pressure, and the same duration is maintained at the pre-blow-molding step of the second cycle as that of the pre-blow-molding step of the first cycle.

14. Method according to claim 3, wherein each blow-molding step (46), during which the blanks (3) are blow molded at a second pressure, includes a pre-blow-molding step (44), during which the blanks (3) are blow molded at a first pressure that is less than the second pressure, and the same duration is maintained at the pre-blow-molding step of the second cycle as that of the pre-blow-molding step of the first cycle.

15. Method according to claim 4, wherein each blow-molding step (46), during which the blanks (3) are blow molded at a second pressure, includes a pre-blow-molding step (44), during which the blanks (3) are blow molded at a first pressure that is less than the second pressure, and the same duration is maintained at the pre-blow-molding step of the second cycle as that of the pre-blow-molding step of the first cycle.

16. Method according to claim 2, wherein:
the degassing step (48) comprises a flushing of the interior of the containers (2) at an intermediate pressure between a blow-molding pressure used during said blowing into the blanks and the atmospheric pressure, and
the delay (Tt) is added after said flushing.

17. Method according to claim 3, wherein:
the degassing step (48) comprises a flushing of the interior of the containers (2) at an intermediate pressure between a blow-molding pressure used during said blowing into the blanks and the atmospheric pressure, and
the delay (Tt) is added after said flushing.

18. Method according to claim 4, wherein:
the degassing step (48) comprises a flushing of the interior of the containers (2) at an intermediate pressure between a blow-molding pressure used during said blowing into the blanks and the atmospheric pressure, and
the delay (Tt) is added after said flushing.

19. Method according to claim 5, wherein:
the degassing step (48) comprises a flushing of the interior of the containers (2) at an intermediate pressure between a blow-molding pressure used during said blowing into the blanks and the atmospheric pressure, and
the delay (Tt) is added after said flushing.

20. Method according to claim 2, wherein, on a blow-molding unit (5) where the entire method is performed, and, during the second cycle of steps, and except for said step where the formed containers (2) are degassed internally, maintained for each of the other steps of the cycle (C2) are the same times as those reserved for each of these same steps during the first cycle (C1) of steps at the first rate.

* * * * *